May 24, 1966  H. W. JACOBSON ET AL  3,252,823
PROCESS FOR ALUMINUM REDUCTION OF METAL HALIDES
IN PREPARING ALLOYS AND COATINGS
Filed Oct. 17, 1961
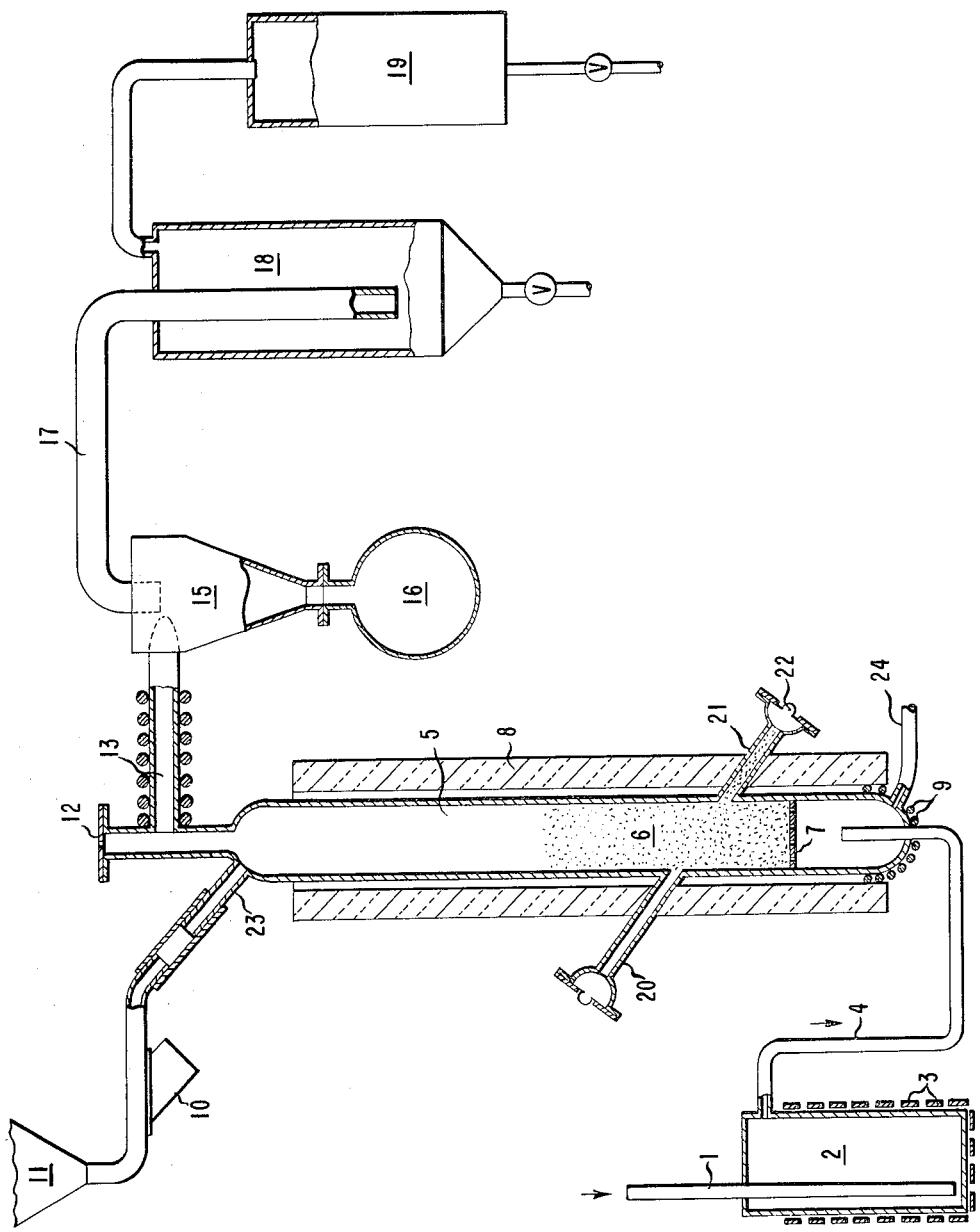
INVENTORS
HOWARD W. JACOBSON
WILMER A. JENKINS II
C. MARCUS OLSON
OSWIN B. WILLCOX
BY Francis J. Crowley
ATTORNEY 3,252,823
PROCESS FOR ALUMINUM REDUCTION OF METAL HALIDES IN PREPARING ALLOYS AND COATINGS
Howard W. Jacobson, Wilmer A. Jenkins II, Carl Marcus Olson, and Oswin B. Willcox, New Castle County, Del., assignors to E. I. du Pont de Nemours and Company, Wilmington, Del., a corporation of Delaware
Filed Oct. 17, 1961, Ser. No. 145,567
9 Claims. (Cl. 117—100)

This invention relates to the aluminum reduction of halides of metals from Groups IV, V, and VI of the Periodic Table.

Aluminum has been previously used as a reducing agent in the reduction of refractory metal halides. For example, titanium tetrachloride has been passed through a bed of aluminum at temperatures in the range of 400° C.–600° C. to form lower titanium chlorides. However, the reaction rate at these temperatures is relatively slow. On the other hand, at temperatures above 600° C., the aluminum particles soften and stick together, and yields become negligible.

The present invention concerns a process for operating an aluminum reduction of refractory metal halides in an agitated bed at temperatures above the melting point of aluminum. This process comprises contacting in a reaction zone the vapor of a refractory metal halide with an agitated bed of solid particles having aluminum at the surface thereof. The maintenance of aluminum at the surface of the bed particles may be accomplished by the use of a bed composed of aluminum alloyed with one or more of the Group IV, V, and VI refractory metals. Such alloys melt well above the melting point of aluminum (e.g., 96% Al–4% Ti melts at about 1000° C. and 98% Al–2% Zr melts at about 1000° C.), and it is found that they will react with the refractory metal halides at temperates above aluminum's melting point without the formation of a liquid phase which would cause the particles to stick together. When such an alloy is used, the bed particle may be wholly of such alloy or the alloy may be present as a coating on an inert particle. As an alternative to these means for providing aluminum at the surface of the bed particles, it is possible to feed metallic aluminum particles to an agitated bed which may be composed of inert particles or metal particles composed of one or more of the Group IV, V, and VI refractory metals or alloys thereof with aluminum. When aluminum is introduced into the agitated bed, it is supplied at a rate relative to the introduction of the halide so that there is an insufficient amount of unreacted aluminum in the bed to form a liquid phase and cause the bed particles to stick together.

The reduction reaction of this invention is carried out at temperatures above the melting point of aluminum and the dew point of the metal halide vapor reactant, but below the melting points of the lower refractory metal chloride and alloys formed by the reduction reaction. Operating temperatures usually lie between 700°C.–1200° C., and preferably between 775° C.–1000° C. By contacting the metal halide with aluminum at the surface of the bed particles at these temperatures, there is a conversion of the refractory metal to a lower oxidation state which is accompanied by the formation of by-product aluminum halide which passes out of the bed as a vapor. Since the refractory metal products are produced in a solid state, they are easily recovered. Aluminum consumed during the reduction reaction may be replenished by the intermittent or continuous addition of aluminum particles to the agitated bed during the course of the reaction. Of course, such an addition should be slow enough to prevent the accumulation of any appreciable amount of unreacted molten aluminum in the bed.

The refractory metal halides useful as starting materials in this invention are $SiCl_4$, $TiCl_4$, $ZrCl_4$, $HfCl_4$, $ThCl_4$, $VCl_4$, $NbCl_5$, $CrCl_3$, $MoCl_5$, $WCl_6$, and $WCl_5$. Although silicon tetrachloride is not usually referred to as a refractory metal halide, it is felt that for the convenience of clarity in describing this invention, it is proper to include the halides of silicon within the term "refractory metal halides." In the process of this invention, the silicon halides are always reduced to elemental silicon. However, the other refractory metal halides may be either partially reduced to lower chlorides or completely reduced to the metallic state. In general, the formation of lower chlorides rather than complete reduction to the metal is favored by using lower temperatures, shorter contact times, or by restricting the amount of aluminum to near or below the stoichiometric requirement based on the amount of incoming chloride. However, by increasing the relative amount of aluminum, raising the temperature, and increasing the retention time, the reduction becomes more complete and the major product is the refractory metal alloyed with aluminum. It was also discovered that when the aluminum is fed to the top of the fluidized bed, there is a greater tendency toward lower chloride formation, while introducing the aluminum at the bottom of the bed favors reduction to the metal. This was surprising in view of the fact that a fluidized bed is considered to be a thoroughly mixed system. This effect may be due to the achievement of a relatively longer retention time in contact with aluminum-rich particles. The ratio of the amounts of vaporous chloride and aluminum supplied to the reaction zone is not at all critical provided the aluminum feed rate is below that which causes agglomeration of particles due to liquid phase. A large stoichiometric excess of aluminum operates to reduce the chloride more completely to an aluminum-rich alloy, the only limit being the formation of an aluminum alloy melting below the operating temperature. By changing the stoichiometry to a large excess of the vaporous chloride, the production of lower chloride is favored. Such large excesses of the chloride are used in obtaining partial reduction of the less active metals of the Fifth and Sixth Groups. Extremely large excesses, of course, result in non-reduction of part of the incoming chloride, but the process still operates to produce some lower chloride.

The attached drawing shows an apparatus which may be used to carry out the process of this invention.

Referring now to the drawing, the inlet pipe 1 serves to admit a stream of carrier gas such as argon to the vaporizer 2, which is kept at the desired temperature by heating element 3. The gas stream carrying the vaporous chloride passes through tube 4 to the base of the column 5. Tube 4 as well as the reaction zone is maintained above the dew point of the vaporous chloride being conveyed through it. The body of solid particles to be fluidized is supported in the column by the perforated plate 7. The column itself which forms the reaction vessel may be constructed of fused silica. The cooler accessories such as pipes 4, the aluminum feeder 10, hopper 11, and the various collectors and traps 15, 18, and 19 may be made of glass or a suitable metal and connected to the silica with suitable ground joints or couplings. The base of the column is heated by elements 9 and the insulating jacket 8 may contain heaters to maintain the desired temperature in the particle bed or reaction zone 6. The top of the column and exit arm 13 are also heated at least above the condensation temperature of $AlCl_3$. The entering tube 23 admits aluminum, preferably in granular form, from the vibrating feeder 10 through a flexible connector. The top opening 12 may be used for the initial charging of the fluidizable solids as well as for insertion of a thermocouple. Once the relationship between the inside temperature at 6 and the outer wall temperature is established experimentally, the internal thermocouple is preferably removed and the temperature control derived from thermocouples placed between the column 5 and the insulation 8. The cyclone 15 and collector 16 are maintained above the dew point of the aluminum halide by-product. Condensers 18 and 19 are used to collect unreacted refractory metal halide and by-product aluminum chloride. When the refractory metal halide is titanium tetrachloride or silicon tetrachloride, condenser 18 is cooled to condense the aluminum halide but maintained above the dew point of the refractory metal halide which is subsequently recovered in condenser 19. With the other refractory metals, condenser 18 is cooled to condense the refractory metal halide but maintained above the dew point of aluminum chloride which is subsequently recovered in condenser 19. The side arm 20 is an alternative location for feeding aluminum. The tube 24 supplies auxiliary fluidizing gas to the bed. Side arm 21 with the plug 22 serves as a discharge means for the solid particles in 6. The system is of course protected from contaminating entrance of air, moisture, etc.

A preferred embodiment of this invention comprises feeding titanium tetrachloride up through a fluidized bed of inert particles, such as sand, maintained between about 775° C. and 1000° C., while feeding aluminum particles to the top of the fluidized bed at the rate of about two atoms of aluminum for three molecules of $TiCl_4$ fed, and passing the products of the reaction evolved from the top of the bed into a second zone where they are cooled below 700° C.; preferably, they are rapidly cooled to temperatures in the range of about 300° C. to about 600° C., whereupon a product rich in titanium dichloride is recovered.

The second or quenching step, when applied to this process, results in a lower chloride product of minimum valence, such as a product rich in $TiCl_2$, $ZrCl_2$, or $HfCl_2$. The cooling may be provided in a number of ways. A cooled walled passage suffices although the product tends to build up on the wall and a scraping mechanism is employed for its recovery. Quenching by the introduction of cooler inert gases or vapors is useful. Recycling of aluminum chloride, especially in the condensed state, effects excellent cooling. The quench cooling may be applied at the cyclone collector shown in the drawing for separating the lower chloride product from by-products and carrier gases.

In another preferred embodiment, niobium pentachloride is vaporized and carried in a stream of argon into a fluidized bed of niobium-aluminum alloy particles maintained at about 775–1000° C. Granular aluminum is simultaneously fed to the bed to replenish the aluminum consumed in the by-product aluminum chloride and in the alloy formed in the process. The particulate niobium-aluminum alloy product is periodically or continuously removed from the fluidized reaction zone and recovered.

For a clearer understanding of the invention, the following specific examples are given. These examples are intended to be merely illustrative of the invention and not in limitation thereof. Unless otherwise specified, all parts are by weight.

*Example I*

An apparatus as illustrated in the drawing was used for the reduction of $TiCl_4$. The reaction column 6 was 3.5″ I.D. and contained four pounds of −90+120 mesh alumina particles. These particles were maintained at 875° C. and fluidized by a flow of argon at .374 linear ft. per second, the gas velocity calculation being based on the cross-sectional area of the empty column. In this example, the vaporizer 2 was maintained at 200° C. and the $TiCl_4$ was metered into the vaporizer where it flash-vaporized into the argon stream. Pure granular aluminum metal, +140 −10 mesh, was fed to the top of the column. 85 grams of aluminum and 2 lbs. of $TiCl_4$ were fed simultaneously over a 15 min. period. The pipe 13 connecting the column with the cyclone was held at about 400° C. and the cyclone separator held at about 300° C. The aluminum chloride condenser 18 was held at 150° C. while the condenser 19 was water cooled to recover the unreacted $TiCl_4$. During this period, 403 grams of fine, crystalline lower chloride of titanium, $TiCl_{2.2}$, were collected in the cyclone, representing a yield of 67% of the $TiCl_4$. About 250 gms. of $TiCl_4$ were recovered at the condenser. About 12 gms. of titanium alloyed with aluminum was found in an Al–Ti coating on the alumina bed particles. In a subsequent operation of similar nature, it was found that the titanium alloy residue in the bed could be converted to lower titanium chloride and aluminum chloride by merely discontinuing the aluminum feed for a few minutes while continuing the flow of $TiCl_4$ which reacts with the titanium as well as the aluminum in the alloy coating.

*Example II*

The apparatus used was essentially the same as used in Example I, except that the silica reaction column was about 6′ long. The column was filled to a depth of about 1 ft. with 100 mesh alloy of the approximate composition: AlTi. Argon was admitted to fluidize the alloy particles and the temperature of the bed raised to 950° C. The vaporizer was heated to 250° C. and $TiCl_4$ admitted at 2 gram mol per minute. Aluminum powder was simultaneously fed to the lower portion of the bed through inlet 20 at a rate corresponding to about 3.5 gram atoms per gram mol of $TiCl_4$. These conditions involve a longer retention time in the bed, a higher temperature and greater proportional aluminum feed than in Example I, and such conditions favor the production of a titanium-aluminum alloy which builds up on the initial alloy particles. After 20 minutes of operation, approximately 20% of the Ti values fed to the reactor was collected as lower chlorides in the cyclone separator, while 50% was converted to metallic Ti–Al alloy and the remainder was recovered in the condenser as unreacted $TiCl_4$. The individual alloy particles recovered from the bed varied somewhat in composition. The particles were well mixed to insure uniformity, and a sample was then analyzed and found to contain about 30% Al.

*Example III*

$TiCl_4$ was reduced as in Example I except that when the $TiCl_4$ was fed to the vaporizer the argon supply was cut back to zero during the first 3 min. of the run, thus depending on the flow of $TiCl_4$ and by-product $AlCl_3$ vapors to maintain the fluidized condition in the bed. The products obtained were approximately the same as in Example I.

*Example IV*

In an apparatus as shown in the drawing, the vaporizer was provided with a series of shelves around the inside walls. These shelves were charged with solid zirconium tetrachloride. The incoming argon and the vaporizer were held at 300–310° C. to provide approximately an equivolume mixture of argon and $ZrCl_4$ vapor which fluidized a bed composed of −100 +200 mesh Zr maintained at 850–900° C. Aluminum particles were fed to the top of the bed at a rate stoichiometric with the formation of $ZrCl_2$. This rate was adjusted on the basis of the rate of argon flow since both the argon and the $ZrCl_4$ were fed at the same volume rate. After about one-half hour of operation, zirconium values in the form of a zirconium-aluminum alloy, zirconium dichloride, and zirconium tetrachloride were found, respectively, in the bed, the cyclone separator, and the first condenser.

Example V

To illustrate the effect of temperature control on this process, an apparatus as shown in the drawing was used. The reaction chamber was a silica tube six feet high with a three-inch inside diameter tube for the reaction chamber. Sand was used as the inert bed material, while the argon and $TiCl_4$ mixture was fed at a rate which gave a retention time of 4.5 seconds in the bed. Aluminum was simultaneously fed to the top of the bed at the rate of 2 mols Al for each mol of $TiCl_4$. The resulting titanium lower chlorides were carried out with the vapors and recovered in a cyclone separator.

In the first run, the reaction temperature was 775° C., and in the second run, the reaction temperature was 900° C. In both the first and second runs, the cyclone separator was operated at 500° C. A third run was made at 900° C., but in this run the silica tube leading to the cyclone separator and the separator itself were cooled to about 350° C. The results were as follows:

| Run | Reaction Temp. | Ti Yield in Lower Chloride, Percent | Valence of L.C. |
| --- | --- | --- | --- |
| 1 | 775 | 37 | 2.4 |
| 2 | 900 | 52 | 2.28 |
| 3 | 900 | 54 | 2.23 |

The alloy initially produced in this invention by the simultaneous introduction of aluminum and the refractory chloride to the reaction zone may be quite high in aluminum. However, according to this invention, it is possible to reduce the aluminum content of the alloy by stopping the aluminum feed while the flow of vaporous chloride is maintained. The high-aluminum alloy particles will then react with the chloride. The aluminum of the alloy seems to react faster than the refractory metal, and the result is an alloy of lessened aluminum content; e.g., as low as 3 to 6% Al in the case of titanium and somewhat lower in the case of the less reactive metals.

Other embodiments not described above may also be employed in this invention. The vaporous chloride supplied to the reaction zone may be produced by any suitable means. Although vaporization prior to introduction into the fluidized solids is preferred, vaporization in the fluidized zone is something practicable. For example, the less volatile normally solid chlorides, some of which sublime, such as $ZrCl_4$, may be fed as powder or crystals to the reaction zone where vaporization occurs promptly at operating temperatures. If meltable chlorides are fed in solid form, the rate of feeding should be such that vaporization is complete before any appreciable quantity of a liquid phase develops in the bed. The aluminum particles fed to the bed should be relatively small so as to provide as much reaction surface as possible, but they should be above the size which will become entrained in the gas stream and carried out of the reactor with the products and by-products. The correct sizes may be determined experimentally for the operating gas flows which are being used. Since the instant process is carried out at temperatures of about 700° C. or higher, it is obvious that a particle of pure aluminum, which melts at about 660° C. could not long exist in the solid state in the reaction zone. The pure aluminum reducing agent can, however, be fed at substantially the rate at which it is consumed without forming a distinct liquid phase in the reaction zone. It is probable that the aluminum reacts as soon as it reaches melting temperature to form a non-liquid alloy. Any traces of liquid aluminum are spread by the vigorous action of the bed over the particles in a film so thin and short-lived that no evidence of a liquid phase appears. Theoretically, there is an upper limit on the rate at which aluminum may be fed to the reactor, depending upon the rate at which the other reactants are fed. However, the reaction has proved to be so rapid that no maximum rate has yet been found experimentally. It is also possible to feed molten aluminum to the reaction zone provided the feed rate is controlled so that the aluminum is consumed rather than being allowed to form a pool of unreacted aluminum. The aluminum may, of course, be supplied as particles of an appropriate aluminum-rich alloy. For example, Al–Si may be fed to the reactor to reduce $SiCl_4$ or to reduce other elements, such as $TiCl_4$. $Al_3Ti$ is another such alloy. Alloy produced in the reaction may be removed intermittently or continuously during the reaction to regulate the bed volume or to maintain the correct particle size for fluidization. The larger particles may be selectively removed from the bottom part of the fluidized bed. The bed material may also be removed in part, sized and returned. Such a step helps to remove fine particles which have resulted from erosion or from chemical action on the initial alloy particles. If fine particles are not removed or enlarged by setting up alloy-producing conditions in the reaction zone, these fines may carry over undesirably to the lower chloride collection zone.

In the process of this invention, the main reaction is thought to take place at the solid surface containing the aluminum. However, some associated reactions may occur near by in the vapor phase. To facilitate the reaction, there should be good contact between the incoming gaseous reactants and the reaction surface. The best way of achieving this desired contact is in an agitated bed of particles containing available metallic aluminum. Agitation is best obtained by fluidization of the particles by the reactant gases and their carrier gases. Another alternative, usually less desirable, is to feed the higher chlorides to a rotating or tumbling reaction chamber or to a zone wherein the particles are agitated.

Carrier gases may be used to help fluidize the particles and to convey the vaporous chlorides into the reaction zone. These gases may be chosen from the inert gases like argon, helium, neon, etc., or recycled aluminum chloride vapor. Hydrogen may also be used, although due to its inflammability, a hazard is introduced. The hydrogen is not consumed as a reducing agent in the presence of aluminum, and hence is substantially inert. These gases and vapors which constitute the process fluids of this invention also carry the solid lower chloride product particles out of the reaction zone for subsequent separation and recovery.

The temperatures maintained in the process steps following the reaction zone are governed by the properties of the substances produced. The temperatures are usually successively dropped on going from the reaction column through the lower chloride product collection, the higher chloride recovery, and the aluminum chloride condensation. When titanium tetrachloride is the reactant, the aluminum chloride is condensed before the residual $TiCl_4$. In the lower chloride collector, which may be a cyclone type or a high temperature filter, the temperature is kept above the dew point of both the aluminum chloride and the unreacted higher chloride, and preferably above the boiling point of $AlCl_3$, to prevent adsorption of the aluminum chloride on the lower chloride product.

Elements other than the refractory metals having vaporizable chlorides reducible by aluminum may be co-reduced in this process to form part of the alloy end product. Examples of such chlorides are $BeCl_2$, $BCl_3$, $FeCl_3$, $PdCl_4$, $PtCl_4$, and $SnCl_4$. Frequently, mere traces of these elements will greatly benefit an alloy.

The inert particles used in this invention are comprised of substances which have melting and thermal decomposition points above the operating temperature. They should be mechanically strong enough to resist any substantial pulverizing by the agitation employed, at least until protected by the alloy coating. They should be capable of holding the alloy coating and substantially non-reactive with the alloys or other ambient substances. Suitable inert materials are sand, silica, alumina, quartz, zirconia, zircon, magnesium oxide, calcium oxide, porcelain, silicate minerals, fluorspar, sodium fluoride crystals, etc. They should be of proper size to be satisfactorily agitated or fluidized in the reaction zone without being entrained in the gas stream to the extent that they leave the reaction zone. This may, of course, be controlled by known factors including shape and size of cross-section of the reactor, etc. in relation to the quantity of gases used.

In the foregoing discussion, it has been shown that both refractory metal particles and inert particles become coated with various aluminum alloys while in the reaction zone. This invention, therefore, includes the process of producing such alloy-coated particles. For example, the particles used in the bed may be spheres, rods, fibers, flakes, etc. designed for a subsequent use such as grinding media or specialty pigments or fillers. This coating step is not limited to the principal bed particles which may be powders or coarse particles capable of being agitated or fluidized, but may be applied to larger bodies suspended in the fluidized bed. One particularly useful application is coating turbine blades with an oxidation-resistant alloy containing, for example, aluminum, tantalum and silicon. Various metal working tools and extrusion dies may be coated with wear-resistant alloys by suspending them in a suitable bed where the aluminum reduction of the chlorides of the alloy-forming metals is being carried out. In many cases, the alloy coating will be initially too high in aluminum. As previously explained, this aluminum may be decreased to a desired level by an after-treatment with the chloride of one or more of the refractory constituents of the alloy. For example, a steel die may be coated with an alloy containing Al, Mo, and Si by suspending it in a fluidized bed of sand while feeding aluminum, $MoCl_5$, and $SiCl_4$ to the bed. When a suitable layer of the alloy is formed, the aluminum feed is stopped, and the flow of $MoCl_5$ and/or the $SiCl_4$ is continued to deplete the aluminum content of the alloy. Many variations are possible in this application of the invention with respect to both the composition of the coating and the order in which the refractory elements are deposited on the object. Thus, multiple layers of varying or graded composition may be formed. Such deposits may, of course, be subject to subsequent heat treatments for the purpose of homogenizing or diffusing into the base metal. Ceramic or high-melting glass bodies may be similarly coated. Sheets or other forms may be hung in the fluidized solids reaction zone to be given a conductive or reflecting coating.

The process of this invention has various uses since two general types of product result: namely, alloys and lower chlorides. In either case, the process shows clear advantage over prior art methods. For example, refractory metal alloys useful as master alloys are produced directly in powder form, thus eliminating the work of melting, casting, and grinding to powder. As already described in Example I, these alloys are formed as thin coatings on the particles in the reaction zone. This offers the unique possibility of placing objects to be coated directly in this zone.

The lower chlorides produced by this method are exceptionally free of contamination. A small trace of $AlCl_3$ may be adsorbed thereon, but heating in a vacuum or stream of inert gas will reduce this to substantially zero. These pure lower chlorides are highly suited for addition to electrolytic processes wherein they are reduced to the metal.

There are several commercial uses for the lower chlorides such as $TiCl_3$, $ZrCl_2$, $TiCl_2$, $CrCl_2$, in their substantially pure form. When they are produced by known methods using sodium or magnesium as reducing agents, the lower chloride products dissolve in the by-product $NaCl$ or $MgCl_2$ and the pure product cannot be isolated. In the case of the prior art reduction by aluminum at temperatures up to 600° C., it is difficult or impossible to completely consume the aluminum. This aluminum residue is also very difficult to separate from the lower chloride product, and its presence impairs its utility. In the preparation of the lower chlorides according to this invention, the lower chloride product is separated from the aluminum as a result of being swept out of the reaction chamber, whereupon it is collected as a crystalline powder. Advantageously, the method is ideally adapted to continuous operation for production of both lower chlorides and the alloy particles. The further advantage of this invention lies in the unique method of coating particles and solid objects with the refractory alloy composition produced.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A process for the chemical reduction with aluminum of a refractory metal chloride selected from the group consisting of $SiCl_4$, $TiCl_4$, $ZrCl_4$, $HfCl_4$, $ThCl_4$, $VCl_4$, $NbCl_5$, $CrCl_3$, $MoCl_5$, $WCl_6$, and $WCl_5$, which comprises contacting in a reaction zone substantially free of any liquid phase the vapor of at least one of said chlorides with an agitated bed of solid particles, said particles having aluminum at the surface thereof, said reaction zone being maintained at a temperature above the melting point of aluminum and the dew point of the chloride vapor and below the melting point of the refractory metal products being produced, thereby forming by-product aluminum trichloride vapor and solid products containing said refractory metals in a lower state of oxidation.

2. The process of claim 1 in which the refractory metal chloride is titanium tetrachloride.

3. The process of claim 1 in which the refractory metal chloride is niobium pentachloride.

4. A process for preparing alloys which comprises feeding aluminum and at least one vaporous, refractory-metal chloride selected from the group consisting of $SiCl_4$, $TiCl_4$, $ZrCl_4$, $HfCl_4$, $ThCl_4$, $VCl_4$, $NbCl_5$, $CrCl_3$, $MoCl_5$, $WCl_6$, and $WCl_5$, to a reaction zone containing a fluidized bed of particles of a refractory metal of a said chloride maintained in the temperature range of 800° C. to 1000° C., said aluminum being fed at a rate less than that which causes agglomeration of said particles and in at least the stoichiometric proportion to completely reduce said vaporous chloride, removing aluminum chloride by-product vapor from said bed and recovering additional refractory metal alloy formed in said bed.

5. The process of claim 4 wherein the aluminum is fed to the lower portion of the fluidized bed.

6. A process for coating a solid object with metal comprising contacting in a reaction zone substantially free of any liquid phase a vaporous, refractory metal chloride selected from the group consisting of $SiCl_4$, $TiCl_4$, $ZrCl_4$, $HfCl_4$, $ThCl_4$, $VCl_4$, $NbCl_5$, $CrCl_3$, $MoCl_5$, $WCl_6$, and $WCl_5$, with an agitated bed of solid particles, said particles having aluminum at the surface thereof, said reaction zone having suspended therein and in contact with said solid particles the solid object to be coated, maintaining said reaction zone at a temperature above the melting point of aluminum and the dew point of the chloride vapor and below the melting point of the refractory metal present in said chloride, thereby reducing said vaporous metal chloride with said aluminum and forming a metal coating on said solid object.

7. The process of claim 6 wherein the metal chloride is titanium tetrachloride.

8. The process of claim 6 wherein the metal chloride is niobium pentachloride.

9. The process of claim 1 wherein there is additionally present a minor amount of vaporous chloride of an element selected from the gorup consisting of beryllium, boron, iron, palladium, platinum, and tin.

References Cited by the Examiner

UNITED STATES PATENTS

| 1,770,177 | 7/1930 | Martin | 117—107.2 |
| 2,599,978 | 6/1952 | Davis et al. | 117—100 |
| 2,745,735 | 5/1956 | Byrns | 75—84.5 |
| 2,820,722 | 1/1958 | Fletcher | 117—107.2 |
| 2,856,312 | 10/1958 | Nowak et al. | 117—107.2 |
| 2,865,868 | 12/1958 | McKinley et al. | 252—467 |
| 3,012,876 | 12/1961 | Eaton et al. | 75—26 |

FOREIGN PATENTS 765,793   1/1957   Great Britain.

OTHER REFERENCES

Cline, James E., and Wulff, Jr.: "Vapor Deposition of Metals on Ceramic Particles," Journal of Electrochemical Society, vol. 98, No. 10, pp. 385–387, October 1951.

WILLIAM D. MARTIN, *Primary Examiner.*

RICHARD D. NEVIUS, K. G. WHEELESS, H. W. MYLIUS, *Assistant Examiners.*